— Patent 2,760,943 —

2,760,943
ELASTIC LIGNIN COMPOSITIONS

August Wilhelm Sohn, Mannheim-Waldhof, Germany, assignor to Zellstofffabrik Waldhof, Mannheim-Waldhof, Germany, a German joint-stock company No Drawing. Application February 15, 1952,
Serial No. 271,850
Claims priority, application Germany March 14, 1951

3 Claims. (Cl. 260—17.5)

The present invention relates to a process for the preparation of new elastic lignin-containing compositions by the admixture of lignin sulfonic acid constituents from waste sulfite liquors with natural rubber, synthetic rubber, polyvinyl chloride and mixtures thereof or the like product, in which mixture the lignin substance contains about 10–30% of liquids which disperses and dissolves the lignin sulfonic acid in colloidal and molecular distribution to facilitate the homogeneous blending thereof with the rubber substance, said mixture being worked-up at elevated temperatures in a rubber kneader or on calendering rolls, in the manner as is usual with the working-up of rubber masses.

With an accurately limited liquid mixture of 10% to at most 30% in the composition of the invention, the neutral lignin sulfonic acid, acidified lignin sulfonic acid and a calcium oxide free alkali salt of lignin sulfonic acid is brought into such a physical state that it can be worked in the form of a molecular or colloidal subdivision into the rubber or synthetic elastic mass in the rubber kneading apparatus to provide a completely homogeneous product with improved properties as compared with the conventional rubber and synthetic rubber mastication process and product. The calcium oxide free alkali salts of lignin sulfonic acid, hereinabove described, consists of the sodium, potassium, ammonium and calcium lignin sulfonates which are purified to remove calcium oxide so that the salts contain less than 1% of calcium oxide calculated relative to the dry substance; the neutral and acidified lignin sulfonic acids are likewise purified in this same technical lime free sense so that they each likewise contain less than 1% of calcium oxide calculated relative to the dry substance.

The heat liberated in the mastication of the rubber component prior to skin formation suffices to soften the lignin component in the composition of the invention and assists the homogeneous incorporation of the lignin component into the rubber. The lignin mass introduced into the elastic component, because of its very fine state of subdivision, exerts an unexpectedly strong dispersing action and serves as a rubber economizing auxiliary in the formulation of the desired elastic product. The lignin component may be used in quantities up to 100% by weight of the rubber, synthetic rubber, polyvinyl chloride or the like, or in mixtures thereof. The liquid serving as solvent and dispersant for the lignin sulfonic acid is water, or lower alcohols, such as methanol, glycerol, glycols such as ethylene glycol, diethylene glycol, propylene glycol and butylene glycol, or formamide, or mixtures of these organic solvents with each other and/or with water. Acid additions may be made to the solvent, such as phosphoric acid, sulfuric acid, acid salts such as aluminum sulfate, water soluble organic acids, and organic acids soluble in the other solvents employed, i. e. formic, acetic and in some cases glycollic acid.

It has already been proposed, in Germany, to admix waste sulfite cellulose liquor lignin in the form of a powder with a water content of about 5%, with rubber as a filler therefor. Attempts of this type could not succeed, since even the dried waste sulfite liquor lignin, regardless of whether it came from roller driers or atomizing driers, never possesses a particle size capable of giving the desired effect in the rubber. An additional consideration is that the lignin of the waste sulfite liquor is infusible, i. e. does not liquefy, even at elevated temperature in rubber or caoutchouc, but instead decomposes at temperatures above 140°.

Likewise, it is impossible to work commercial concentrated waste sulfite liquor containing 50–60% of dry substance, into rubber, because of the high water addition.

Better results are given by the rubber products developed in America from rubber and alkaline, i. e. fusible as well as acidifiable lignin. It is known that the surfaces of the lignin have in some way to be activated or altered e. g. by oxidation processes, if the effect of a good filler action in rubber is to be realized. The especial suitability of alkali lignin is ascribable to this. According to this known process, the lignin, obtained from the so-called black liquor of the alkaline soda process or of the sulfate cellulose process, in solution with caustic soda and water in amounts up to 40%, is admixed with latex milk, and this mixture acidified and precipitated with sulfuric acid.

The lignin sulfonic acid product used in the invention is obtained from fermented or unfermented waste sulfite cellulose liquor, which liquor is a product of the conventional sulfite or bisulfite cellulose decomposition product. The waste sulfite liquor from the conventional paper making process is first neutralized with a base, e. g. with liquid or gaseous ammonia, then after concentration, precipitation and the filtration of the lime by the addition of sulfuric acid, the sulfuric acid is neutralized with alkali such as soda to bring it to a substantially neutral pH. The neutralized lignin sulfonic acid purified in this manner is evaporated to dryness and redispersed and redissolved under stirring and/or kneading with a liquid such as water, alcohols, formamide, etc. at temperatures of at least 40–100° C., preferably 70–80° C. to obtain a highly viscous lignin sulfonic acid solution which solidifies at 20° C. to a solid resinous mass.

The thermoplastic resinous mass obtained by redispersion is added in amounts up to 100% to the rubber component on a masticating roller. It is more advantageous to work-up the lignin sulfonic acid mass together with the elastic material in a closed rubber kneader to form a "batch." Upon renewing the heating during this working-up of the "batch," the lignin sulfonic acid mass becomes quite soft and is taken up by the rubber component in such a state of subdivision as to provide the improved processing and product features of the invention.

The rubber component may be plasticized in order to facilitate its blending with the lignin component. The lignin component may be admixed with additional auxiliaries for specifically desired properties in the final product; the addition of carbon black, alumina gel, plasticizers for the rubber component and materials to reduce the viscosity of the rubber component may be added to the lignin component to improve the processing during the blending operation and to render the incorporation of these materials in the rubber component as superfluous.

The synthetic rubber component which is utilized in the process and product of the invention is a synthetic polymerized diolefine or copolymer thereof such as a butadiene acrylonitrile copolymer, a butadiene styrene copolymer, an isobutylene butadiene copolymer, a chlorinated polybutadiene such as polychloroprene and neoprene, etc.

An object of the invention is the preparation of new elastic milled rubber products consisting essentially of a natural rubber, synthetic rubber, or mixtures thereof together with a lignin material obtained from waste bisulfite liquors which have been neutralized or made slightly acid, freed of calcium impurities to eliminate organically bound lime (CaO) and calcium sulfite to obtain a lime free lignin sulfonic acid containing less than 1% CaO, calculated relative to the dry substance, evaporated to dryness and redispersed in 10 to 30% of a liquid such as water, lower alcohols, glycerol, glycols, formamide, and mixtures thereof with or without water, said lignin material being in a state of colloidal and molecular subdivision so that it is doughy at 40–80° C. and solidified at 20° C., the mixture being calendered and masticated at elevated temperature to provide a homogeneous incorporation of the ingredients.

A further object of the invention is the preparation of a new elastic lignin-containing product wherein the lignin substance identified hereinabove is admixed with one or more fillers and reinforcers such as alumina, lamp black, chalk, zinc, oxide, lubricants such as graphite, etc., plasticizers for the rubbery material, viz. rubber, synthetic rubber, and mixtures thereof, coloring matter such as aniline dyes, and natural resins as additives for the rubber whereby the lignin product acts as a dispersant for the homogenization of the additives with the rubbery component and wherein amounts of the lignin product up to 100% of the rubbery component are used in the milling at elevated temperatures.

A further object of the invention relates to the improvement of the process of manufacture of rubber elastic products and the novel product obtained thereby wherein the lignin component, hereinabove identified, is admixed with one or more of the ingredients, aniline, urea, melamine, albuminous substances, formaldehyde and furfural, which additives react with the lignin in a first stage, at temperatures below 100° C. for a sufficient period of time to condense with the lignin, whereafter the product of said first stage of reaction is homogeneously blended with the rubber component, hereinabove identified, at elevated temperatures above 100° C. in a mastication and calendering homogenizing process which is then followed by a final vulcanizing step. The rubber or synthetic rubber component, as this term is hereinabove defined, is utilized as an aqueous emulsion and the lignin sulfonic acid component is admixed with an aldehyde to condense therewith in order to modify the lignin component to improve its precipitability after the so-reacted lignin component has been blended with the rubber component in the emulsion.

Other and further objects of the present invention will appear from the more detailed description set forth below, it being understood that such more detailed description is given by way of illustration and explanation only and not by way of limitation.

If an acidifiable resinous product from waste sulfite liquor is desired, e. g. for working into aqueous rubber dispersions, then the purified or unpurified lignin substance together with the lignin dissolving liquid, e. g. water, may be reacted with substances which, during the working-up with the lignin sulfonic acid, react with the latter at temperatures below 100° with an increase in the size of the molecules, thus to improve the precipitation and homogenization, and under the conditions of the vulcanization at temperatures above 100° to initiate a final condensation in the insoluble form. Suitable for this purpose are aldehydes together with one or more of aniline, aminotriazines, melamine, dicyandiamide, urea, other aminoplasts and soluble albumin compounds. When a precondensation of the lignin sulfonic acid with the added chemicals takes place, the admixture can take place at 20°, and the liberated reaction heat suffices for the precondensation.

The property of precipitability by acids is produced by condensation with an aldehyde, e. g. furfural, acetaldehyde, formaldehyde, and other aliphatic aldehydes in the kneader; however, the product becomes further reacted and water-insoluble, only by the vulcanization process under pressure at temperatures above 100°. In this way, only, does a reinforcing or strengthening effect appear. For working up lignin sulfonic acid resin with latex, it has been found that use can be made only of lime-free lignin sulfonic acid, in the technical sense hereinabove defined. Sustantial improvement in the strength of the vulcanizate obtained from the homogenizing of a rubber or synthetic rubber emulsion component with the lignin component is attained when the aldehyde reaction product of the lignin component is further reacted with amines and amides such as aniline, melamine, dicyandiamide, urea and other aminoplasts. Soluble albumin compounds likewise modify the lignin component to improve the strength of the resulting vulcanizate. The aldehyde reaction product improves the blending quality of the lignin component with the rubber emulsion component. The blending quality is maintained over a wide range of pH, i. e. about 5– about 8.

Admixture of the lignin sulfonic acid, which has been treated with lignin-dissolving liquids, with a natural rubber mixture in an amount of 20%, relative to the weight of the rubber, gives improved technical data in the vulcanizate prepared therefrom, as shown by the following test results for a soft mixture:

A lignin mixture is composed of the following constituents; the parts being parts by weight:

75 parts of calcium ligninsulfonate (lime free), obtained from waste sulfite liquor, pulverized and air-dried
7 parts of formaldehyde (30% formaldehyde by weight)
3 parts of formic acid (100% by weight)
8 parts of water
7 parts of aniline, are blended to form a lignin sulfonic acid mass.

The mixture contains the following ingredients (all parts in parts by weight):

|  | Mixture I | Mixture II |
| --- | --- | --- |
| light crepe | 100.0 | 100.0 |
| active zinc oxide | 5.0 | 5.0 |
| stearic acid | 1.5 | 1.5 |
| sulfur | 3.0 | 3.0 |
| mercaptobenzothiazole | 0.8 | 0.8 |
| lignin sulfonic acid mass | | 20.0 |

Vulcanization—25 minutes, 3 atmospheres absolute.

The following comparative values were realized:

|  | Mixture I | Mixture II |
| --- | --- | --- |
| Tear Resistance, kg/cm. longitudinal | 10.1 | 20.1 |
| Tear Resistance, kg/cm. transverse | 11.0 | 17.4 |
| Notch Strength, kg/4 mm. of thickness longitudinal | 2.7 | 5.9 |
| Notch Strength, kg/4 mm. of thickness transverse | 3.3 | 6.2 |
| Hardness according to Shore, Shore degrees | 25.0 | 38.0 |
| Elongation at rupture in percent of original length | 118.7 | 130.6 |
| Specific Gravity | 1.01 | 1.06 |

The preceding, which deviate considerably from the examples, are not absolute values, but serve only to demonstrate the comparative strength increase upon addition of lignin products according to the invention.

The below described testing values for the examples hereinafter, were determined in accordance with the following procedures:

(a) *Tearing resistance tests (resistance to tearing by needle).*—Strips of vulcanizate 20 millimeters wide and 50 millimeters long are bored through at a distance 5 millimeters from the edge with a 1 millimeter diameter steel needle. The minimum load necessary to tear the strip is determined on a Schopper rubber tearing machine which provides a pulling velocity of 100 millimeters per minute. The strength obtained in the foregoing table indicates the tearing strength on the testing standard as measured in kilograms per centimeter. See the procedure in the text by Dr. Paul Klukow, "Verarbeitung von Kautschuk," Union Deutsche-Verlagsgesellschaft Berlin, Roth & Co., 1941, page 46. This text is regarded as the bible in the rubber industry in Germany.

(b) *Notch strength, tenacity, or structural strength.*—Notch strength, also designated as structural resistance to tear is standardized in German DIN 53507 of November 1943; and the value determined herein is based upon a fan test conducted as set forth in the text by Dr. Paul Klukow, "Verarbeitung von Kautschuk," Union Deutsche-Verlagsgesellschaft Berlin, Roth & Co., 1941, page 46. The values obtained are given in kilograms per 4 millimeters of thickness or may be reported in kilograms per centimeter of thickness.

(c) *Hardness tests.*—Hardness is determined in accordance with the spring penetration depth on the test body in the method of Shore, the value obtained in Shore degrees.

(d) *Specific gravity.*—Specific gravity was determined by the bouyancy method.

(e) *Elongation at rupture, expressed as per cent elongation of the original length.*—The rubber tearing machine of the firm of Zwick & Co., Ulm-Einsingen, was used in accordance with DIN DVM 3504 using a test specimen form which is a standard rod, StI the rupture elongation equals the per cent elongation of the original length at the moment of rupture.

An addition up to 15% of lignin sulfonic acid substance or in some cases more, calculated relative to the weight of the rubber, is suitable for a rubber shoe sole mixture, whereby the hardness of the vulcanizate is improved, without impairing the other technical data.

For a floor covering mixture or similar mixtures for technical purposes, lignin sulfonic acid substance in amounts up to 40% or in some cases more, also calculated relative to the weight of the rubber, may be added in order to obtain a vulcanizate of enhanced hardness. The same is true for rubber seals and other technical molded rubber articles.

The admixture of lignin sulfonic acid substance in amounts of about 10%, calculated relative to the weight of the rubber, with synthetic rubber, such as Perbunan and Polysar, i. e. copolymers of butadiene and acrylonitrile, improves the workability of the elastic material, such as skin formation, absorbability of fillers and sprayability.

The lignin sulfonic acid acts here as a softener. In the co-vulcanization of different layers of rubber, the added lignin sulfonic acid has a favorable influence on the flowing together (interflow).

The following examples given by way of illustration and not of limitation of the invention, show practical methods for the preparation of the new lignin-containing elastic material of the invention and the improvements in the processing of rubber, synthetic rubber, mixtures thereof, and the like with the addition of the lignin component of the invention.

EXAMPLE 1

Fermented neutralized pine waste sulfite liquor is concentrated down to a dry content of 50% and is then pulverized by atomization. The thus-produced lignin sulfonic acid substance is treated in the kneader at temperatures between 70 and 80° C. by the addition of hydrochloric acid and so much water that a highly viscous lignin sulfonic acid solution results which, with a dry content of 80%, has a pH value of 5.0 and, upon cooling, solidifies to a solid resin-like mass. One part of this mass is perfectly admixed in the rubber kneader with one part of natural rubber.

As solvent for lignin, use may be made, in place of water, or lower alcohols, e. g. methanol or glycerol, glycol, formamide or mixtures of these solvents with each other or with water. Suitable acids comprise, among others, phosphoric acid, sulfuric acid, acid salts, e. g. aluminum sulfate, as well as the organic acids which are soluble in water or in the particular lignin solvent employed. These organic acids include formic, acetic and glycollic acid.

EXAMPLE 2

Crude aspen waste sulfite liquor, without further pretreatment, is evaporated down to a dry content of 50% and dried on the roller dryer. The lime content is less than 1% CaO based on the dry weight. The thus obtained lignin sulfonic acid substance is treated in the kneader, at temperatures between 70 to 80° C., by the addition of hydrochloric acid and such quantity of water that a highly viscous lignin sulfonic acid results which, with a dry content of 80%, has a pH value of 5.0 and becomes rigid upon cooling into the form of a resinous solid mass. One part of this mass can be homogeneously admixed in the rubber kneader with one part of natural rubber.

EXAMPLE 3

The sodium salt, prepared in known manner, of the lignin sulfonic acid of a beech waste sulfite liquor is worked-up, in the form of powder, by kneading with glycerol and formic acid at 60–65° C., into a highly viscous lignin sulfonic acid solution which contains 84% of dry substance and has a pH value of 5.5. One part of the mass, solidified at room temperature, is worked up on the rollers with 4 parts of natural rubber, which was just precedingly masticized up to skin formation. After the addition of 0.1 part of sulfur, 0.2 part of zinc oxide and 0.03 part of Vulkacit mercaptobenzothiazole is vulcanized for 10 minutes at 150° C., and there is produced a material of hardness, 60° Shore, and a notch strength of 9 kg./4 mm. thickness as measured by the German standard procedure DIN 53,507 of November 3, 1943. Natural rubber vulcanized under like conditions without lignin sulfonic acid or other added filler has a hardness of only 45° Shore and a notch strength of 6 kg./4 mm. thickness.

EXAMPLE 4

The lignin mass according to Example 1 is worked up in the following admixture:

| | Parts by weight |
|---|---|
| Butadiene-acrylonitrile-mixed polymer | 100.0 |
| Zinc white | 5.0 |
| Activated carbon CK3 (Degussa, brand of Deutsche Gold und Silberscheideanstalt in Frankfurt am Main) | 40.0 |
| Lignin sulfonic acid mass of Example 1 | 10.0 |
| Stearic acid | 1.5 |
| Sulfur | 1.0 |
| Reaction product of mercaptothiazole and diethylamine; Vulkazit AZ, sold by Bayer, Leverkusen | 0.6 |

The inclusion of the lignin sulfonic acid mass shows up as a good auxiliary in the working-up, in that the skin formation, filler absorption and sprayability are enhanced. The technical data for the vulcanizate (2.1 atm. for 20 minutes) are as follows:

| | |
|---|---|
| Tensile strength | 168 kg./cm.$^2$. |
| Elongation at rupture, in percent | 525%. |
| Resid. elongation | 18%. |
| Modulus or load in kilograms at 300% elongation of the original length | 81 kg./cm.$^2$. |
| Hardness in degrees Shore | 70° Shore. |
| Elasticity | 41%. |
| Notch strength (DIN 53507) of Nov. 3, 1943 | 19 kg./4 mm. |

Resistance to swelling in benzene is improved.

Elasticity was determined by the method as set forth in German standard sheet DIN 53,513 in per cent (dimensional) as impacted and rebound elasticity. The DIN sheets correspond to the ASTM sheets in the United States.

Tensile strength was determined by German Standard Method DIN-DVM 3504 of November 1938, carried out according to Schopper-Dalen (Member Handbuch der Kautschuk Wissenschaften, page 610) and the values obtained expressed in kg./cm.²

EXAMPLE 5

72 parts of the pulverulent lignin substance obtained according to Example 1 are kneaded in the kneader for 45 minutes with 4 parts of furfural, 11 parts of water, 3 parts of formic acid and 10 parts of aniline at temperatures between 80 and 90° C., a precondensation taking place, so that a highly viscous lignin solution which solidifies in the cold and has a pH value of 5.5 is formed. One part of this mass is worked into one part of smoked sheets in the kneader and under the same conditions as in Example 2 yields a vulcanizate of hardness in Shore degrees, 71° Shore with otherwise equal technical data.

EXAMPLE 6

The solidified highly viscous lignin sulfonic acid mass according to Example 5 is up to 3%, calculated relative to the weight of the rubber, is worked into the mixture of a protective rubber component of the following composition, in parts by weight:

| | |
|---|---|
| Smoked sheets Defo 1500 | 100.00 |
| Activated carbon CK 3 | 45.00 |
| Zinc white RS | 7.50 |
| Lignin sulfonic acid mass | 3.00 |
| Sulfur | 3.00 |
| Mercaptobenzothiazole | 0.90 |

The vulcanizate (2.0 atm., 30 minutes) gave the following test values:

| | |
|---|---|
| Resistance, tensile strength | 267 kg./cm.² |
| Elongation at rupture in percent. | 580%. |
| Resid. elongation | 26%. |
| Hardness in degrees Shore | 69° Shore. |
| Modulus or load in kilograms at 300% elongation of original length. | 99 kg./cm.² |
| Elasticity | 50% |
| Notch strength | 50 kg./4 mm. thickness. |
| Wear or grinding resistance; cubic mm. of material ground off from rubber test body under load of 1 and of 5 kg. grounding path of 40 meters, standard lubrication on AP machine, Schopper, German Patent 53,506. | 100/103, 100 by 1 kg., 103 by 5 kg. |

The admixture of the lignin sulfonic acid product shows no disadvantageous effect in ageing tests.

The values for modulus and wear were determined in accordance with the following standard German procedures:

Modulus equals load in kilograms per sq. cm. at 300% elongation of the original length.

Wear equals mm.³ of worn (or ground off) material from the rubber test body under loads of 1 kg. and of 5 kg. on a rubbing or grinding path of 40 m. with a standard lubricant, so that two corresponding values are obtained.

This test is carried out on the wearing or grinding machine made by Schopper, Leipzig, according to the German standard Patent No. 53,506.

EXAMPLE 7

A lignin sulfonic acid mass for shoe sole mixtures contains the following ingredients, in parts by weight:

69 parts of calcium ligninsulfonate powder, air-dried, special light (CaO free)
7 parts of formaldehyde, 30%
3 parts of aluminum sulfate, dissolved in 10 parts of water
7 parts of aniline The incorporation of these ingredients to effect the dissolution of the lignin is carried out at 20°. A shoe sole mixture in parts by weight prepared with addition of this lignin mass consists of:

| | |
|---|---|
| Smoked sheets | 100.00 |
| Natural resin (gum colopony) | 2.50 |
| Phenylcyclohexyl-p-phenylenediamine | 1.00 |
| Lignin sulfonic acid mass | 10.00 |
| Fibrous material, waste textile powder | 32.50 |
| Coloring material, inorganic pigment | 11.75 |
| Filler, finely divided calcium carbonate or calcium silicate | 72.50 |
| Softener, a mixture of fatty acid sulfonate and oxidized oil | 2.50 |
| Mercaptobenzothiazol (Vulkacit) | 2.25 |
| Sulfur | 2.50 |
| Zinc oxide | 12.50 |
| Weight (parts) | 250.00 |
| Rubber fraction, percent | 40.00 |

The technical data of the light brown shoe sole sheet, vulcanized at 130° C. for 8 minutes are as follows:

Wear, for 1 kg. load (only) ____ 250 mm.
according to DIN Vornorm 53513 of March 1943

$$\text{Wear in mm.}^3 = \frac{\text{loss in weight} \times 200}{\text{density } 4 \times \text{angle of seizure}}$$

For density see DIN 53550.

| | |
|---|---|
| Hardness in degree Shore | 83° Shore. |
| Tear resistance | 30.5 kg./cm. |
| Dynamic flexure at 30,000 blows in 5 hours | 0 |
| Tensile strength | 59.8 kg./cm.² |

No deleterious effects apparent during ageing tests.

The artificial ageing of soft rubber is tested according to DIN–DVM 3508 of February 1939. The test pieces were stored either in a heating chamber for about 7 days or even longer at 70°±1° C., or were exposed for 48 hours or even longer to the action of oxygen at 20±0.5 atm. abs. and 60°±1° C. and the changes thereupon ascertained.

EXAMPLE 8

The lignin sulfonic acid mass according to Example 7 is incorporated, in a rubber kneader, into a floor covering mixture in amounts of 30%, calculated relative to the weight of the rubber, and sheets are produced, after vulcanization, of a Shore hardness up to 92° Shore and with adequate dynamic resistance to bending.

The dynamic testing is carried out with test pieces of 15 mm. width, 100 mm. length and 3.5 mm. thickness on a "permanent bend" apparatus (Manufacturer: Koch, Bandelmann & Paasch, Magdeburg-Buckau) at 20±1° C. The free gripped length is 45 mm., the beating is 20 mm. in the longitudinal direction with simultaneous tilting of one of the gripped ends to the extent of 25°. 30,000 beatings (blows) of this type are carried out in about 4 hours. The obtained values must be less than 2.

EXAMPLE 9

A lignin sulfonic acid mass, lime-free, from pine waste sulfite liquor, which is suitable for coprecipitation with rubber emulsions, has the following composition, in parts by weight:

72 parts of sodium lignin sulfonate powder (lime free)
15 parts of formaldehyde (27% by weight)
6 parts of caustic soda solution (25% by weight)
7 parts of aniline.

In place of the sodium lignin sulfonate, it is also possible to use the ammonium salt or the free lignin sulfonic acid, which are lime-free.

The ingredients are stirred at temperatures between 80 and 90°, precondensation taking place, and are then allowed to cool into a transportable form. 100 parts of the lignin mass in 600 parts of water are brought to a concentration of 3–4% NH₃ by the addition of ammonia at 60° and, after cooling, admixed with 166 kg. of 60% latex. By addition of aluminum sulfate solutions, there is obtained, in an ideal state of subdivision, a mixed rubber coagulate, which consists up to 50% of lignin sulfonic acid product. The lignin sulfonic acid-rubber emulsion can also be used, in suitable concentration, as a binder for leather and other fibrous materials. The hardening of the lignin sulfonic acid mass, which causes a reinforcement of the rubber, does not take place until the vulcanization at temperatures from 140° C.

EXAMPLE 10

The lignin sulfonic acid mass according to Example 9, brought into a dry, comminuated, easily handled form, is dissolved up to about 15% in hot water. The cooled solution is used for the preparation of leather fiber plates, as follows: 100 kg. of leather fibers, consisting of vegetable-tanned material, are mixed in a hollander mixer with a large quantity of water. Then a mixed binder solution is prepared, consisting of: 10 kg. of rubber dry-substance in the form of a dilute natural rubber latex and 5 kg. of transportable lignin sulfonic acid mass in the form of the above solution.

This mixed solution is added to the fiber pulp and is stirred. Then the binder is precipitated on the fiber with the usual quantity of aluminum sulfate solution and, finally, the conventional amount of a softening oil plasticizer (oil sulfonate mixture which acts as a softening agent as well as a wetting agent) is added. After renewed mixing, the fiber is deposited on 4 plate sieves and freed of water. The pressing and drying of the plates takes place in the usual way. The obtained leather fiber material gives, as regards tear resistance and water absorption, the same values as a material prepared with 15 kg. of pure rubber dry-substance in the form of latex per 100 kg. of leather fibers, but gives higher needle tear resistance and a sole-like form of sheet or plate. It is excellently suited for the manufacture of caps.

What is claimed is:

1. A normally solid lignin composition comprising a lignin component containing less than 1% free calcium as calcium oxide, obtained by evaporating to dryness waste neutralized sulfite liquor, freed from calcium oxide, and by redispersing in, from 10% to 30% by weight, a liquid selected from the group consisting of water, lower aliphatic alcohols, and aqueous lower aliphatic alcohols, said lignin composition being doughy at 40°–80° C. and solid at 20° C. and adapted to disperse up to 100% by weight of a rubber component selected from the group consisting of natural rubber, butadiene-acrylonitrile polymer, butadiene-styrene polymer, butadiene-isobutylene polymer and chloro butadiene polymer.

2. A normally solid lignin composition comprising a lignin component containing less than 1% free calcium as calcium oxide, obtained by evaporating to dryness waste neutralized sulfite liquor, freed from calcium oxide, and by redispersing in, from 10% to 30% by weight, a liquid selected from the group consisting of water, lower aliphatic alcohols, and aqueous lower aliphatic alcohols, said lignin composition being doughy at 40°–80° C. and solid at 20° C. being dispersed with up to 100% by weight of a rubber component selected from the group consisting of natural rubber, butadiene-acrylonitrile polymer, butadiene-styrene polymer, butadiene-isobutylene polymer and chloro butadiene polymer.

3. A normally solid lignin composition comprising a lignin component containing less than 1% free calcium as calcium oxide, obtained by evaporating to dryness waste neutralized sulfite liquor, freed from calcium oxide, and by redispersing in, from 10% to 30% by weight, a liquid selected from the group consisting of water, lower aliphatic alcohols, and aqueous lower aliphatic alcohols, said lignin composition being doughy at 40°–80° C. and solid at 20° C. and modified by heating at from 80°–100° C. with a minor amount of a hardening agent consisting of a mixture of a lower aldehyde and a material reactive with said aldehyde selected from the group consisting of aniline, urea, melamine and soluble albumin and being dispersed with up to 100% by weight of a rubber component selected from the group consisting of natural rubber, butadiene-acrylonitrile polymer, butadiene-styrene polymer, butadiene-isobutylene polymer and chloro butadiene polymer.

References Cited in the file of this patent
UNITED STATES PATENTS

| | | |
|---|---|---|
| 2,077,884 | Howard et al. | Apr. 20, 1937 |
| 2,161,749 | Samarus et al. | June 6, 1939 |
| 2,266,265 | Rieche | Dec. 16, 1940 |
| 2,365,599 | Schirm | Dec. 19, 1944 |
| 2,377,709 | Meunier | June 5, 1945 |
| 2,387,619 | Seidel | Oct. 23, 1945 |
| 2,443,889 | Bruce | June 22, 1948 |
| 2,491,832 | Salvesen et al. | Dec. 20, 1949 |
| 2,533,632 | Salvesen et al. | Dec. 12, 1950 |
| 2,542,344 | Mersereau | Feb. 20, 1951 |

OTHER REFERENCES

Rubber Age, September 1945, page 701.